Figure 1:
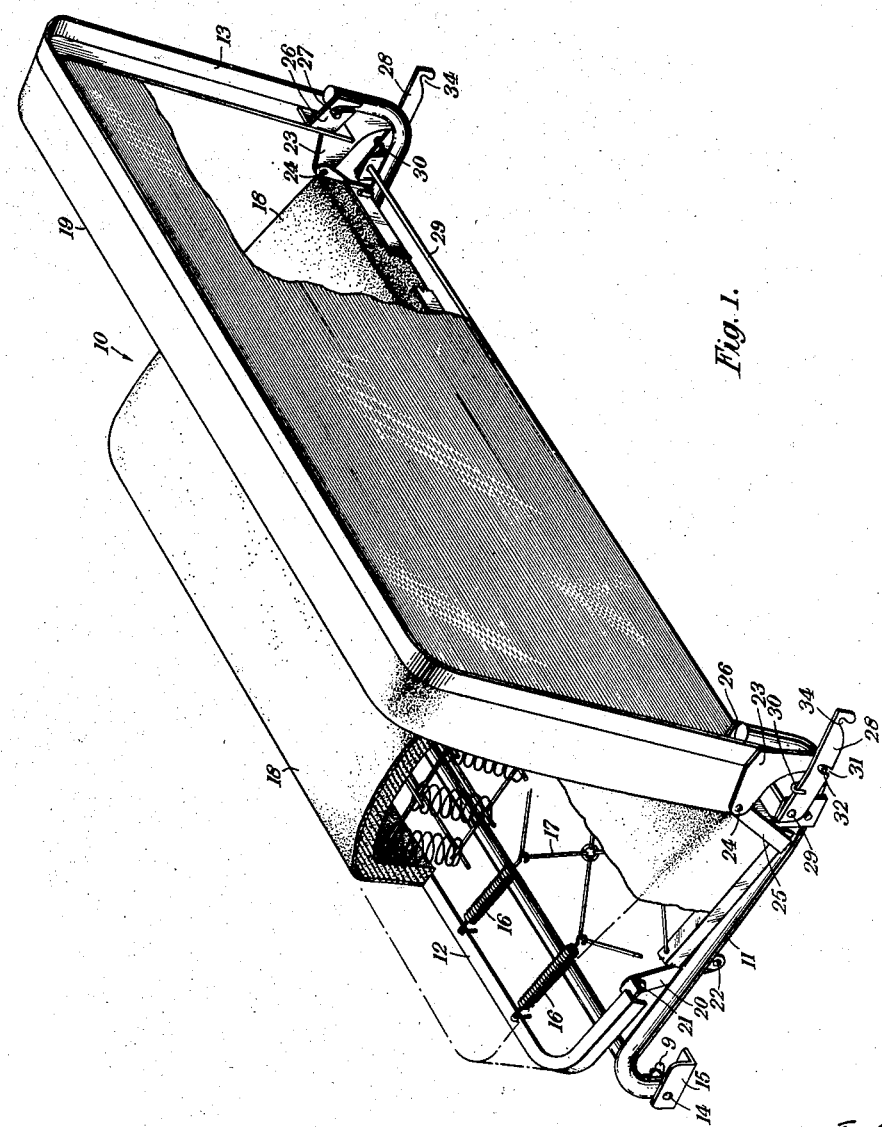

Nov. 11, 1958  C. H. W. CARTE  2,859,798
SEATS
Filed Aug. 8, 1956  4 Sheets-Sheet 1

INVENTOR
CECIL HENRY WALTER CARTE
ATTORNEYS
Mason, Noel & Noel

Nov. 11, 1958  C. H. W. CARTE  2,859,798
SEATS
Filed Aug. 8, 1956  4 Sheets-Sheet 2

INVENTOR
CECIL HENRY WALTER CARTE
ATTORNEYS
Moses, Nolte + Nolte

Nov. 11, 1958     C. H. W. CARTE     2,859,798
SEATS
Filed Aug. 8, 1956     4 Sheets-Sheet 4
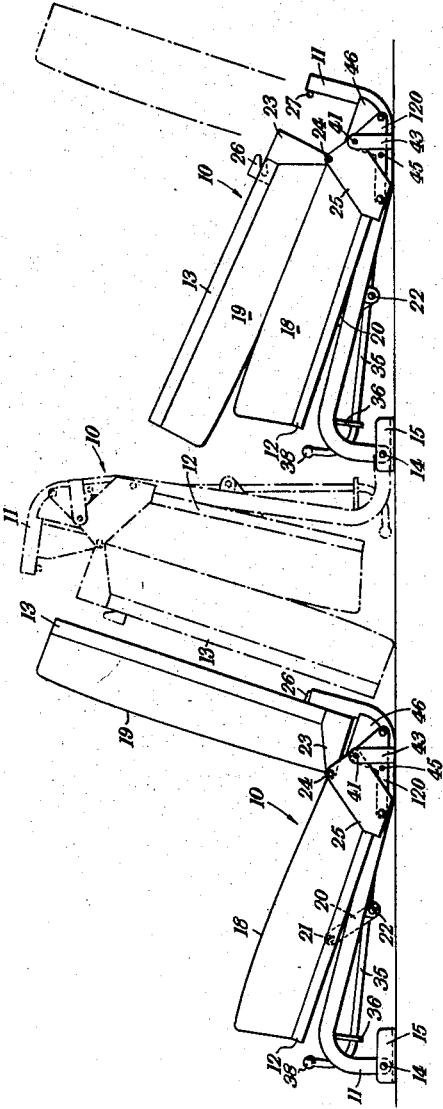
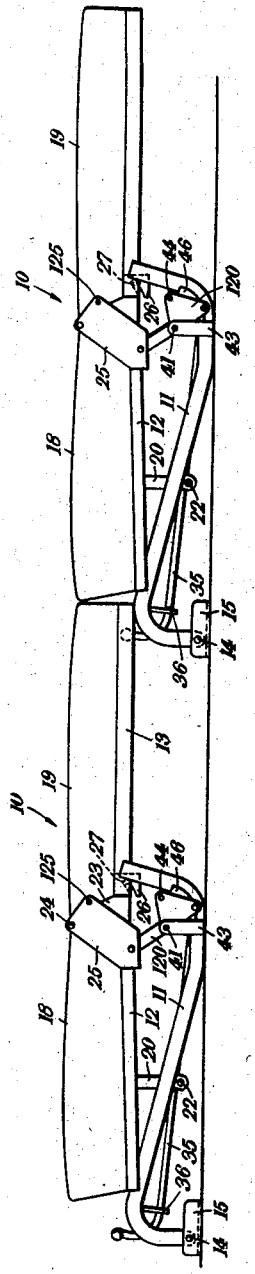
INVENTOR
CECIL HENRY WALTER CARTE
ATTORNEYS

United States Patent Office 2,859,798
Patented Nov. 11, 1958

2,859,798

SEATS

Cecil Henry Walter Carte, Folkestone, England, assignor to Martin Walter Limited, Folkestone, England Application August 8, 1956, Serial No. 602,731

Claims priority, application Great Britain January 30, 1956

10 Claims. (Cl. 155—6)

This invention provides a seat unit of the type which can readily be converted into a bed or settee and has for its object to simplify the operations involved in the conversion. The seat unit according to the invention is of particular utility in a motor road vehicle, e. g. a commercial van, an ambulance or a private car, but it also finds useful application in ships' cabins and in aircraft or as a portable convertible chair.

The seat unit according to the invention comprises a seat frame and a back frame hinged at one end to the seat frame, the frames being movable to either of two alternative positions, viz. a seating position in which they collectively constitute a seat, and a flat position in which they extend substantially horizontally and in substantial alignment, a locking mechanism for maintaining one of the frames in each of its alternative positions, and means for supporting the other frame in each of its alternative positions, the frames being movable, on release of the locking mechanism, from the seating to the flat position by application of rearward and downward pressure to the free end of the back frame and without further action on the part of the operator.

In its preferred form, the seat unit according to the invention comprises a base structure, a seat frame mounted for movement in relation to the base structure between a seating position, in which its rear end is at a lower level than its front end, and a flat position, in which it extends substantially horizontally, a back frame hinged at one end to the seat frame and mounted for movement in relation to the base structure between an upright seating position and a flat position in which it extends substantially horizontally and in substantial alignment with the seat frame, a manually operable locking mechanism for locking one of said frames in each of its alternative positions, and means for supporting the other frame in each of its two alternative positions, the frames being movable, on release of the locking mechanism, from the seating to the flat position by application of rearward and downward pressure to the free end of the back frame and without further action on the part of the operator.

When the seat unit is in its flat position it constitutes a large flat seat, a settee or a small bed. Two identical seat units according to the invention may conveniently be mounted in tandem on the floor of a vehicle so that, when both are in the flat position, they collectively form a full length bed. The width of the seat units determines the width of the full length bed so provided, and when the seat units are bench seats a double bed will be provided. The seat and back frames of the unit will normally carry squabs which form the mattress of the bed. By removal of the squabs the seat units, when in the flat position, may be used as a stretcher carrier.

Conversion of the seat unit from its one configuration to the other is an extremely simple operation as it only involves releasing the locking mechanism and raising or lowering the free end of the back frame as the case may be.

Figure 2:
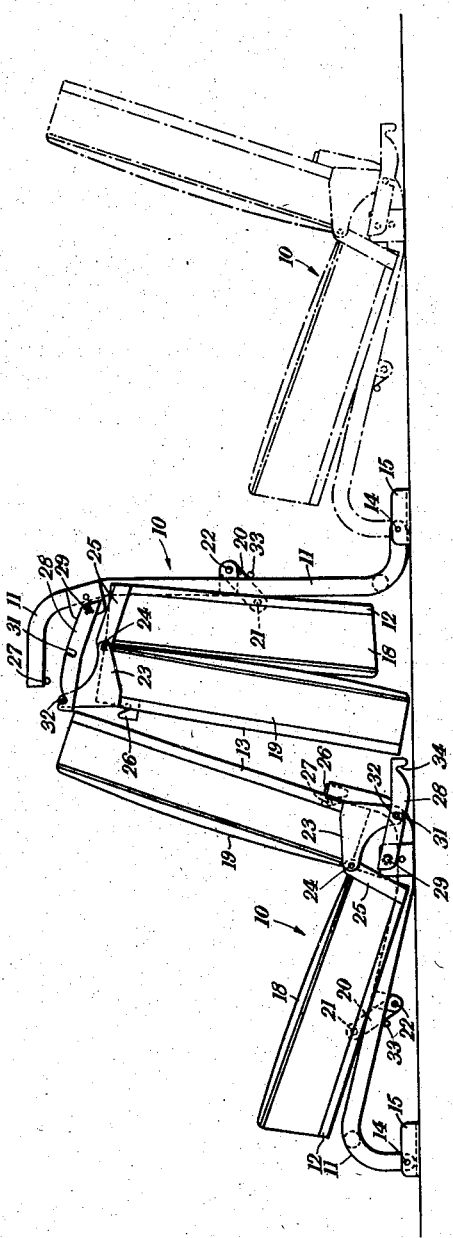
Figure 3:
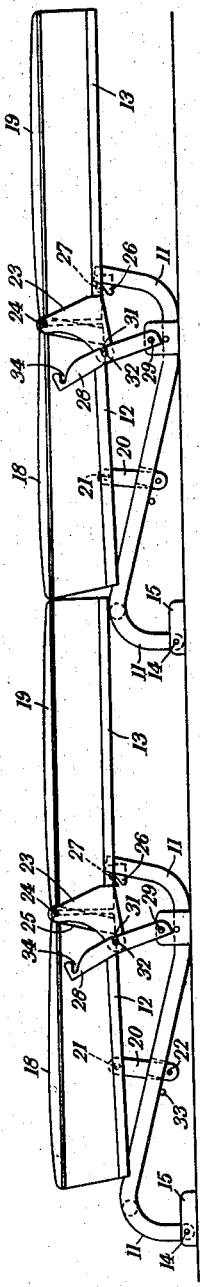
Figure 4:
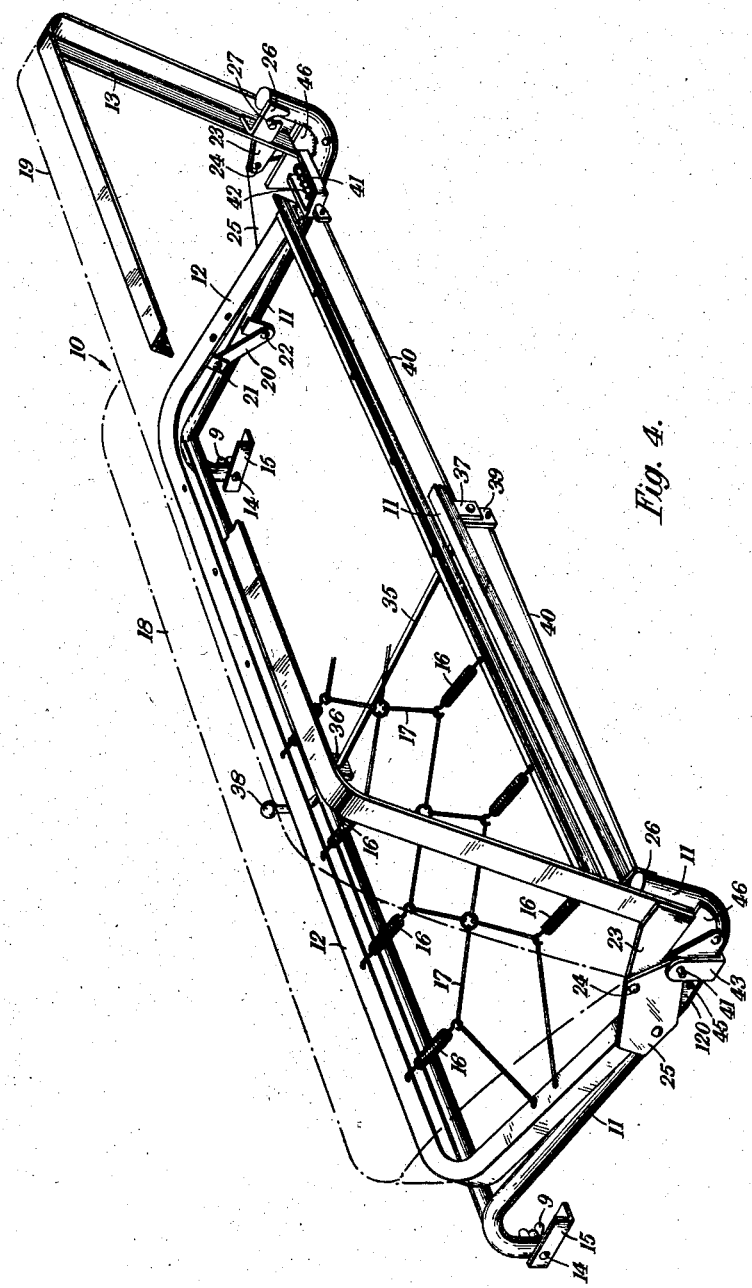

Two alternative embodiments of the invention will now be described in detail, by way of example, with reference to the accompanying drawings, in which:

Fig. 1 is a perspective view, partly in section, of one of the seat units of the first embodiment, Fig. 2 is a side elevation showing two of the seat units of Fig. 1 mounted in tandem in a vehicle, the front seat unit being shown in the seating position and the rear seat unit being shown in full lines in the stowed position and in chain dotted lines in the seating position, Fig. 3 is a view similar to Fig. 2 but showing the two seat units in the flat position and collectively forming a full length bed, Figs. 4, 5 and 6 correspond respectively to Figs. 1, 2 and 3 and show the second embodiment, which differs from the first mainly in regard to the mechanism for holding the seat and back frames of the seating units in their alternative positions.

Like reference numerals designate like parts throughout the figures.

In both of the arrangements illustrated in the drawings, the two seat units 10, which are identical, are of the bench type and are mounted in tandem on the floor of a vheicle. When moved to the position shown in Figs. 3 and 6 they collectively form a full length double bed. Narrower seat units can, of course, be used. Thus the vehicle may contain two pairs of narrower seat units arranged in tandem to form separate front and rear seats, and which can be converted into two full length single beds.

In the arrangement shown in Figs. 1–3 each seat unit comprises a base frame 11, a seat frame 12 and a back frame 13. The base frame 11 is of tubular metal and is hinged at 14 to a pair of brackets 15 (one only of which is shown in Figs. 1–3 although both brackets are shown in Fig. 4) fixed to the floor of the vehicle. The seat frame 12 is of angle section laced with springs 16 and wire mesh 17 and carries a seat squab 18. The back frame 13 is also of angle section and carries a back squab 19. The base frame 11 is held to the brackets 15 by wing nuts 9, one of which is seen in Fig. 1. By removing the wing nuts, the seat unit can be disengaged from the brackets and removed from the vehicle. The seat frame 12 is supported on the base frame 11 by two parallel links 20, one at each side of the unit, each link being pivoted at its upper end 21 to the seat frame and at its lower end 22 to the base frame. The back frame 13 carries a bracket 23 at each side, which is pivoted at 24 to a lug 25 upstanding from the seat frame. The back frame also carries at each side a notched plate 26 for engaging a pin 27 on the base frame. Catches 28 are provided at opposite sides of the base frame and attached to a rod 29 rotatably mounted in the base frame. The catches 28 are urged by springs 30 to the position shown in Fig. 1, in which a notch 31 in each catch engages a pin 32 on the associated bracket 23 on the back frame. The catches 28 act, in conjunction with stops 33 (Fig. 2) projecting from the sides of the base frame and engaging the front ends of the links 20, to hold the seat and back frames securely in the seating position shown in Fig. 1. The catches 28 lock the back frame 13 to the base frame and prevent it from rotating about the pivot pins 27 and the seat frame 12 is supported in the inclined position by the stops 33.

As will be seen, when the seat unit is in the inclined or seating position shown in Figs. 1 and 2, the rear end of the seat frame 12 is at a lower level than its front end and the back frame 13 occupies an upright position, with its upper end disposed to the rear of its front end. To convert to the flat or bed position, shown in Fig. 3, all that is required is to raise one of the catches 28, whereupon both catches will be disengaged from the pins 32, and to push the top of the back frame 13 rearwardly and downwardly. The back frame 13 then moves in a clockwise direction about the pivot pins 27 and causes the rear end of the seat frame 12 to lift and at the same time to move rearwardly until finally both frames reach the flat position shown in Fig. 3. The raised catch 28 is then released, whereupon the springs 30 automatically shift the catches to re-engage the pins 32 and thereby lock the back frame 13 in the flat position. The seat frame 12 is supported in the flat position by the links 20.

It will be observed that, when in the flat position the seat frame 12 does not extend precisely horizontally or in precise alignment with the back frame 13. However, the squabs 18, 19 are brought into alignment to form a horizontal surface. The two seat units, as shown in Fig. 3, come close together when moved to their flat positions, without, however, physically supporting one another, and collectively from a full length bed.

To return the seat unit to the inclined seating position, the catches 28 are disengaged from the pins 32 and the rear end of the back frame 13 is lifted. This reverses the previously described movement and when the frames reach the position shown in Fig. 2 the catches 28 are released and automatically re-engage the pins 32 to lock the frames in the position shown in Fig. 2.

To shift the seat unit from the inclined to the stowed position shown for the rear seat unit in full lines in Fig. 2, the catches 28 are disengaged and the upper end of the back frame 13 is pushed forward, disengaging the notched plates 26 from the pins 27. After the back frame has been folded on to the seat frame, the catches 28 are released to permit notches 34 in the catches 28 to engage the pins 32 to hold the frames 12, 13 in the closed position. The entire seat unit is then moved, by lifting its rear end, about the pivots 14 until it reaches the vertical stowed position. Obviously a reversal of these movements will return the front unit from the stowed to the inclined position.

The seat unit shown in Figs. 4–6 differs from that so far described mainly with respect to the locking mechanism. The seat frame 12 is, however, in this case supported on the base frame 11 by two pairs of parallel links 20, 120, each of the rear links 120 having a pair of locking holes 44, 45.

The locking mechanism is controlled by a rod 35 (Fig. 4) pivoted in brackets 36, 37 on the base frame and having its front end turned up to form a handle 38. A plate 39 fixed to the rod 35 is attached by rods 40 to a pair of locking plungers 41 provided with return springs, one of which is shown at 42. When the seat unit is in the inclined position shown in Figs. 4 and 5, the hole 44 in each of the links 120 is in alignment with holes in brackets 43, 46 on the base frame and a hole 125 (Fig. 6) in the bracket 25 on the seat frame, and each of the locking plungers 41 extends through these four holes to lock the seat frame 12 in the inclined position. The back frame 13 is supported in the upright position by the pins 27.

To convert the unit to the flat position, the handle 38 is moved to rotate the rod 35 anticlockwise as seen in Fig. 4, thereby withdrawing the locking plungers 41 from the holes in the links 120 against the action of the springs 42. The seat unit is then moved as already explained, to the flat position by rearward and downward pressure on the top of the back frame 13. This brings the holes 45 in the links 120 into alignment with the holes in the brackets 43, 46 and when this position is reached the rocking plungers 41 are automatically forced by their springs 42 into the holes to lock the seat frame 12 in the flat position as shown in Fig. 6. The pins 27 support the back frame 13 in the flat position. The seat unit is restored to the inclined position by disengaging the locking plungers by means of the handle 38 and lifting the rear of the back frame 13. The locking plungers again engage automatically when the holes 44 in the links 120 come into register with the holes in the brackets 43, 46.

It is not necessary to disengage the locking mechanism in order to move the seat unit from the inclined to the stowed position. All that is necessary is to fold the back frame 13 down on to the seat frame as shown in full lines for the rear seat unit in Fig. 5, and then to rotate the whole seat unit about the pivots 14 into the vertical position shown in chain dotted lines.

What I claim as my invention and desire to secure by Letters Patent is:

1. A non-reversible seat unit comprising a base structure, separate seat and back frames each of which is adapted to support a squab, hinge means near the adjacent edges of the frames constituting the sole direct connection between said frames and permitting the back frame to be folded on to the seat frame, means supporting said frames on said base structure and permitting support of said frames on said base structure in two alternative positions, one of said positions being a seating position in which said frames cooperate to form a seat affording a back support and the other position being a flat position in which said frames are aligned to form a bed, and a manually operable locking device for cooperation with one of said frames to lock it to the base structure in each of its alternative positions.

2. A non-reversible seat unit comprising a base structure, separate seat and back frames each of which is braced to support a squab, hinge means near the adjacent edges of the frames constituting the sole direct connection between said frames and permitting the back frame to be folded on to the seat frame, means supporting said back frame on said base structure, a pair of parallel links respectively pivoted at their ends to opposite sides of the seat frame and to opposite sides of the base structure, said links and back frame supporting means permitting movement of said frames in relation to the base structure from a seating position in which said frames collectively form a seat affording a back support to a flat position in which said frames are aligned to form a bed, said links also supporting said seat frame in each of said alternative positions, and a manually operable locking device for engaging said back frame to lock it to said base structure in each of its alternative positions.

3. A non-reversible seat unit comprising a base structure, separate seat and back frames each of which is braced to support a squab, hinge means near the adjacent edges of the frames constituting the sole direct connection between said frames and permitting the back frame to be folded on to the seat frame, a pair of parallel links at each side of said seat frame, each of said links being pivoted at its upper end to the seat frame and at its lower end to the base structure, means supporting said back frame on said base structure, said links and said back frame supporting means permitting movement of said frames in relation to the base structure from a seating position in which said frames collectively form a seat affording a back support to a flat position in which said frames are aligned to form a bed, and a locking device comprising a locking plunger engageable with a hole in one of said links to lock the seat frame in its flat position and engageable with another hole in said link and also with a hole in said seat frame to lock the seat frame in its seating position.

4. A non-reversible seat unit comprising a base structure having an upward extension at the rear end, separate seat and back frames each of which is braced to support a squab, hinge means near the adjacent edges of the frames constituting the sole direct connection between said frames and permitting the back frame to be folded on to the seat frame, means supporting said back frame on said upward extension of the base structure, a pair of parallel links respectively pivoted at their ends to opposite sides of the seat frame and to opposite sides of the base structure, said links and said back frame supporting means permitting movement of said frames in relation to the base structure from a seating position in which said frames collectively form a seat affording a back support to a flat position in which said frames are aligned to form a bed, and a manually operable locking device associated with said seat frame for locking it to said base structure in each of its alternative positions.

5. A seat unit comprising a base structure, a seat frame, a back frame, each of said frames including cross bracing members for supporting a squab, a hinge connecting the rear end of the seat frame to the lower end of the back frame, pivots disposed to the rear of and above said hinge, said pivots supporting the back frame on the base structure and permitting movement of the back frame in relation to the base structure from an upright seating position to a flat position, a pair of parallel links connecting the seat frame to the base structure and disposed on opposite sides of the seat frame, said links permitting upward and rearward movement of said hinge, as the back frame is moved from its upright to its flat position, to cause said seat frame to move from an inclined seating position to a position aligned with said base frame and a manually operable locking device mounted on said base structure for securing one of said frames to said base structure in each of its alternative positions.

6. A seat unit according to claim 5, wherein said pivots comprise pins and cooperating brackets which are separable to permit the back frame to be folded against the seat frame.

7. In a vehicle, the combination with a floor bracket of a seat unit according to claim 5 and a pivot connecting the base structure of the seat unit to said floor bracket and permitting said seat unit to be folded forwardly in relation to said floor bracket to a stowed position in which the seat frame and the back frame extend vertically.

8. A seat unit according to claim 5, said locking device including a spring loaded locking plunger movable by said spring to engage alternative holes in another link connecting the seat frame to the base structure.

9. A seat unit according to claim 8, comprising a handle disposed beneath the front of the seat frame and a linkage connecting said handle to said plunger and operable by said handle to retract said plunger against the action of said spring.

10. A non-reversible seat unit comprising a base structure, separate seat and back frames each of which is braced to support a squab, hinge means near the adjacent edges of the frames constituting the sole direct connection between said frames and permitting the back frame to be folded on to the seat frame, means supporting said frames on said base structure and permitting support of said frames on said base structure in two alternative positions, one of said positions being a seating position in which said frames cooperate to form a seat affording a back support and the other position being a flat position in which said frames are aligned to form a bed, and a manually operable locking device for cooperation with one of said frames to lock it to the base structure in each of its alternative positions, said locking device including a pair of locking elements respectively disposed at opposite sides of said frames and means connecting said locking elements and constraining them to move together to and from their operative positions.

References Cited in the file of this patent

UNITED STATES PATENTS

| | | |
|---|---|---|
| 1,668,167 | McKenna | May 1, 1928 |
| 1,677,434 | Dorton | July 17, 1928 |
| 1,718,042 | Hamsing | June 18, 1929 |
| 2,304,199 | Pinnow | Dec. 8, 1942 |
| 2,655,197 | Schofield | Oct. 13, 1953 |
| 2,738,829 | Rowe | Mar. 20, 1956 |

FOREIGN PATENTS

| | | |
|---|---|---|
| 30,759 | Australia | Dec. 17, 1931 |
| 737,162 | France | Oct. 3, 1932 |
| 996,206 | France | Aug. 29, 1951 |